Dec. 25, 1928. Re. 17,172

C. B. SPALSBURY

PROCESS OF SHOE MANUFACTURE

Original Filed July 7, 1925 4 Sheets-Sheet 1

Inventor:
CHARLES B. SPALSBURY,
By John N. Bruninga
His Attorney.

Dec. 25, 1928. Re. 17,172

C. B. SPALSBURY

PROCESS OF SHOE MANUFACTURE

Original Filed July 7, 1925 4 Sheets-Sheet 2

Inventor:
CHARLES B. SPALSBURY,
By John N. Bruninga
His Attorney.

Dec. 25, 1928. Re. 17,172

C. B. SPALSBURY

PROCESS OF SHOE MANUFACTURE

Original Filed July 7, 1925 4 Sheets-Sheet 3

Inventor:
CHARLES B. SPALSBURY,
By John N. Bruninga
His Attorney.

Dec. 25, 1928. Re. 17,172

C. B. SPALSBURY

PROCESS OF SHOE MANUFACTURE

Original Filed July 7, 1925 4 Sheets-Sheet 4

Inventor:
CHARLES B. SPALSBURY,
By John N. Bruninga
His Attorney.

Reissued Dec. 25, 1928. Re. 17,172

UNITED STATES PATENT OFFICE.

CHARLES B. SPALSBURY, OF ST. LOUIS, MISSOURI, ASSIGNOR TO JOHNSON, STEPHENS & SHINKLE SHOE COMPANY, OF ST. LOUIS, MISSOURI, A CORPORATION OF MISSOURI.

PROCESS OF SHOE MANUFACTURE.

Original No. 1,602,368, dated October 5, 1926, Serial No. 41,998, filed July 7, 1925. Application for reissue filed November 2, 1927. Serial No. 230,671.

My present invention is an improved method or process of manufacturing boots and shoes, and is directed more particularly to the improvement in the art of manufacturing shoes employing an insole, outsole, and through and through stitching. More particularly my present invention is directed to the production of an improved shoe, wherein all metallic fasteners, tacks, staples, clamps, adhesives, or the like holding devices, are eliminated from along the forepart and shank of the resulting shoe structure.

Another object is to provide a method whereby the upper is so lasted and retained as to closely conform to the last, while substantially obviating the presence of lasting tacks in the completed shoe.

Another object is to provide a method whereby the outsole is temporarily tacked to the lasted upper while the latter is held under tension due to the lasting so as to be retained in the desired close conformation to the last.

Another object is to provide a method whereby the upper is retained in conformation with the last while the outsole is seamed thereto, although substantially obviating the presence of lasting tacks in the completed shoe, especially in the fore part.

Further objects and features will appear from the detail description, taken in connection with the accompanying drawings.

Generally stated, in accordance with this invention, the upper is so lasted as to conform closely to the last; this is accomplished by wiping the upper over the last and more particularly over an insole placed thereon; the upper is wiped substantially continuously therealong, as by moving an edge notched or divided wiper plate over the last or insole and at closely adjacent points therealong. An outsole is then placed on the lasted upper, and more particularly over the wipers holding the upper, so as to aline the outsole with the lasted upper. The outsole is then temporarily tacked to the lasted upper and while the latter is held under tension due to the wiping; this is accomplished, in accordance with one embodiment of this invention, by inserting temporary lasting tacks through the outsole and into the lasted upper and even into the insole, at spaced points corresponding to the notches in the wipers and while the latter are in wiping relation. The outsole and upper, and even the insole, are thus retained in assembled relation and in close conformity with the last; the wiping means can then be withdrawn while the parts are so retained and the outsole can be moved or pressed down on the lasted upper and close thereagainst. The last can then be withdrawn and the upper and sole parts permanently secured together, as by seaming or stitching through the outsole, upper and insole; the lasting tacks can then be withdrawn. There is thus produced a shoe of the McKay type, which is not only free of tacks, especially at the forepart, but which conforms closely to the last on which it was made. In the particular embodiment described and illustrated the forepart and shanks are successively lasted and tacked.

An important feature of my present method consists in the fact of enabling the lasting tacks or holding devices to be driven while the upper materials and insole are held firmly in final position to which they are stretched by the lasting operation, also applying tacks or other holding devices while the lasting means are still in their extreme lasted position, and while the upper materials and insole are held together under the tension of the lasting devices. Then as the upper materials, leather, lining, etc., are held drawn tightly to the wood of the last on which the shoe is made, and while the same are held under the tension of the lasting instrumentalities, my invention enables the temporary lasting tacks to be then driven. However, prior to applying the lasting tacks, I fit and apply an outsole. After the upper is lasted along the forepart, I may then apply a filler and a shank stiffener, and thereupon the outsole is applied, the lasting devices during all this time holding the upper under tension. Thereupon the lasting tacks are driven through the outsole, upper and insole, along the sides of the forepart. Thereafter, the shank portion of the shoe is similarly lasted, and while this shank portion is also held under the tension of the lasting devices, the lasting tacks may be driven through the outsole, upper materials and insole along each side of the shank of the shoe.

For the purpose of lasting boots and shoes by my present method, I prefer to employ side lasting plates or wipers, and with provision for yielding engagement upon the upper materials, said plates to be slotted or recessed to permit the driving of lasting tacks through the slotted or recessed portions while the lasting devices hold the upper under tension, as above explained. Machines suitable for this purpose are shown and described in Patents, Nos. 1,580,449, April 13, 1926, and 1,588,916, June 15, 1926; it will, however, be understood that other machines may be used for this purpose and that this method may be performed by simple manipulation.

An illustrative embodiment of a complete process as at present employed by me will now be described.

First: The upper materials of usual form, style, size and pattern are assembled upon a last, together with an insole, either by hand or by an assembling machine. Thereupon the assembled upper and insole are preferably subjected to the usual pulling over operation, and a plurality of "stay" tacks are applied, which are subsequently removed. Thereafter I may last the heel seat, and if desired the extreme toe portion, driving in permanently clinched lasting tacks. I may last the toe portion and hold the same by suitable adhesive until the outsole is applied, or I may utilize the method and toe lasting devices shown in Patent No. 1,584,820, May 18, 1926.

With the shoe upper and insole thus prepared, the procedure is then as follows: The shoe on its last is placed in my novel type of side lasting machine; the lasting operation lasting the forepart is performed by the manipulation of the slotted wipers under tension stretching the upper material tightly about the last and holding the same then under tension until the outsole and temporary lasting tacks are applied. Before applying the outsole a filler piece and shank stiffener may be fitted if desired. Thereupon the outsole is applied and the removable lasting tacks are driven from the outside or bottom of the outsole and through the slots in the wipers as above explained. Then the lasting wipers are released and withdrawn, and the operator forces the outsole down snugly against the lasted upper on the insole along the margin to move the outsole tightly against the insole and upper materials and close the slight space caused by the width and thickness of the lasting wipers. This can be effected in any desired manner and preferably is quickly and easily done by the operator as he inspects the shoe, applying pressure to the margin of the outsole along the shank of the lasting tacks by means of a tack lifter or other device.

The shank portion is then lasted in a similar manner and by a substantially similar machine with lasting wipers of suitable contour for the shank. Prior to this shank lasting, or subsequent thereto, a metallic or other shank stiffener can be applied, if it has not been previously fitted to the shoe. The shank portion of the outsole is then secured to the upper and insole by driving removable lasting tacks therethrough and in a position disalined from the line of stitching, in substantially the same manner as that practiced in lasting the forepart. The shank lasting wipers are then withdrawn, and the marginal edge of the outsole snugly pressed against the insole to take up the space of the shank lasting wipers.

The shoe is now completely lasted so that the upper conforms closely to the last and furthermore has the outsole already secured to the insole and upper by the removable lasting tacks holding the entire shoe structure together with ample strength to permit the withdrawal of the last and the application of through and through stitching. The last is then withdrawn with the lasting tacks still in the shoe and projecting from the outer surface of the outsole and these tacks being disalined from the line of stitching, which stitching is preferably set in a groove in the outsole, the through and through or so-called McKay stitching is applied without displacing or removing the tacks. After the stitching is thus applied, the shoe is then relasted, and thereupon I preferably remove the lasting tacks from around the forepart and the shank, thus leaving the forepart and shank portion of my improved shoe entirely free of tacks, clamps, adhesives, or any other auxiliary fastening left permanently within those portions of the shoe structure, as has been customary and necessary in prior methods of manufacture, employing through and through stitching. Moreover the shoe will present a finished appearance and shape since it conforms closely to the last on which it was made, because the upper was tacked and retained not only while under tension due to the wiping around and over the last, but while the upper was wiped substantially continuously therealong, particularly along the forepart.

While I prefer to utilize the slotted type of lasting wipers, so that the temporary lasting tacks can be driven therethrough, it is equally feasible to drive the lasting tacks beyond the edge of the wipers, or to slightly withdraw the wipers just before tacking, but still holding the upper under tension. These or substantially equivalent alternatives or modifications are intended to be included in certain of the broader claims herein.

Referring to the drawings, illustrating the preferred method of carrying out my present invention, Fig. 1, is an approximate perspective view of an assembled upper and insole on a last.

Figure 4:
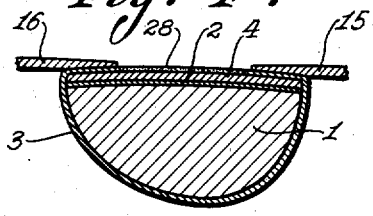
Figure 3:
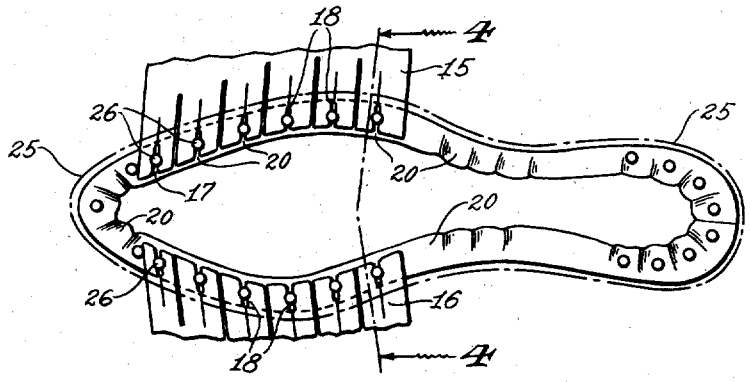
Fig. 3, is a plan view illustrating my step of lasting the forepart.

Fig. 4, being a corresponding cross-sectional view on the line 4—4 of Fig. 3.

Figure 5:
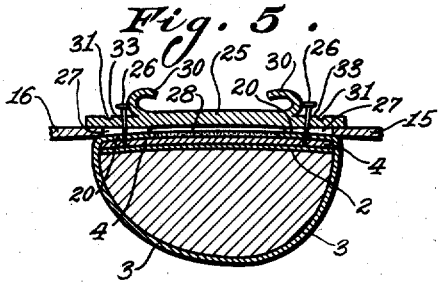

Fig. 5, is a similar cross-sectional view to that shown in Fig. 4, but with the outsole applied and the lasting tacks or equivalent temporary holding devices securing the lasted upper in position.

Figure 6:
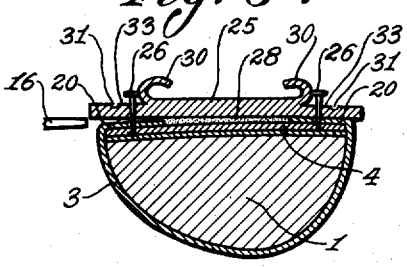

Fig. 6, is a cross-sectional view corresponding to Figs. 4 and 5, showing the withdrawing of the lasting wipers and the "snugging down" of the outsole along the shanks of the temporary lasting tacks, to force the outsole, lasted upper and insole firmly in union and to displace the spaces left by withdrawing of the lasting wipers.

Figure 7:
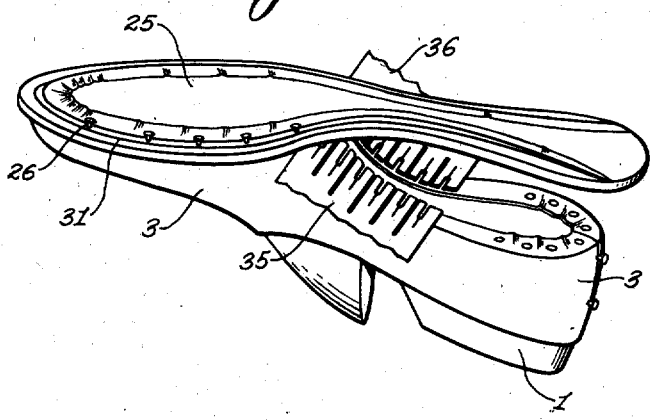

Fig. 7, is a perspective showing the forepart lasted, the shank and heel portion of the outsole turned upwardly, and the shank lasting wipers partly in position.

Figure 8:
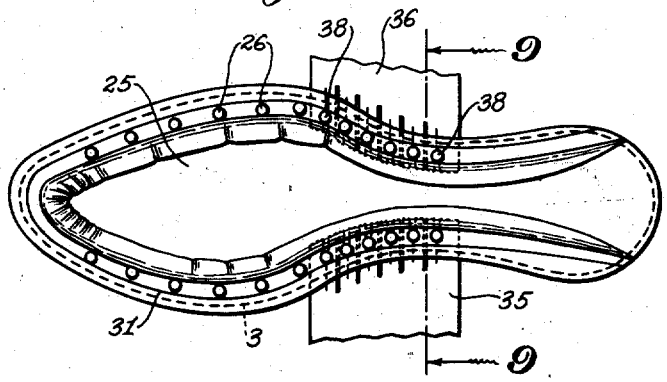

Fig. 8, is a plan view of the shank lasting step.

Figure 9:
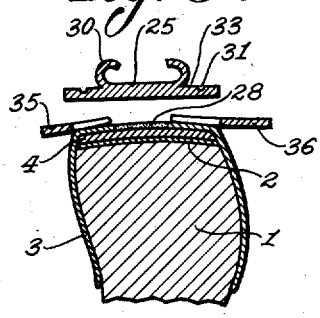

Fig. 9 is a cross-sectional view on the line 9—9 of Fig. 8.

Figure 10:
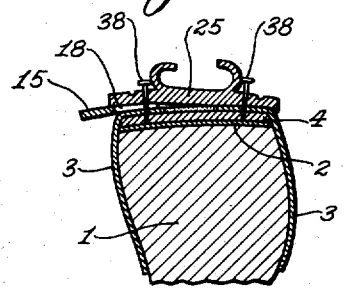

Fig. 10, is a cross-sectional view similar to that shown in Fig. 8, with the outsole applied, the lasting tacks partially driven in, with the lasting wiper on one side being shown in position, and on the other side withdrawn and the outside "snugged down".

Figure 11:
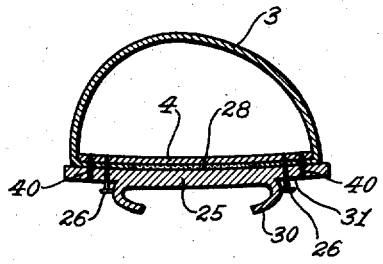

Fig. 11, is a cross-sectional view through the forepart, showing the shoe withdrawn from the last and the through and through stitching applied.

Figure 12:
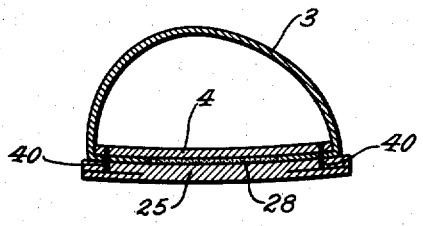

Fig. 12, is a corresponding cross-sectional view illustrating the lasting tacks withdrawn and the sole attaching process completed.

Referring to the drawings, 1 indicates a last, which may be of any suitable form, style, size or standard make, and either hinge, block or other type of last, it being a feature of my invention that no special last is required. The usual metallic clinching plate 2 may be fitted to the last.

Figure 1:
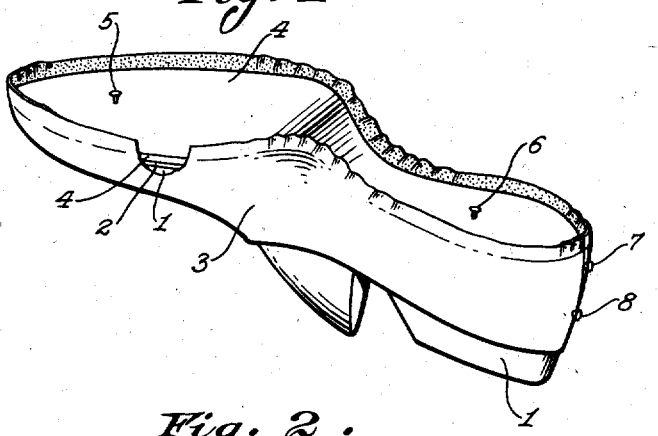
Figure 2:
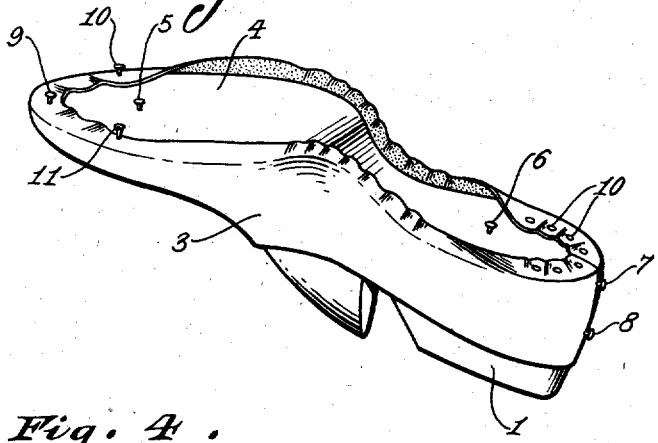
Fig. 2, is a corresponding perspective view illustrating the pulling over and temporary securing of the toe portion of the upper and insole.

3 indicates shoe upper materials, usually comprising the usual leather outer portion and such inner lining as is desired, including also a box toe and counter where required. While in the drawings I show a type of low shoe or oxford, my invention is not of course so limited, but will apply to any type, style or form of shoe, which is or can be made by this process. 4 indicates the usual type of insole used in McKay shoe manufacture, viz, an insole without sewing ribs, without "gemming", without channel lips, or other operations performed thereon. An important feature of my present process is that I utilize a very inexpensive and preferably thin innersole, which indeed may be of leather, or composition, such as leather-board or the like, requiring sufficient strength to retain, temporarily, the removable lasting tacks, and to hold the permanent through and through stitching. Therefore I can utilize thin and inexpensive stock for the insole of my improved shoe, which could not otherwise be employed. However, a typical grade of so-called McKay insole is preferable in carrying out this process. The upper 3 and insole 4 being assembled on a last, the insole being temporarily held by the usual toe and heel tacks 5 and 6, and the upper by one or more heel tacks 7 and 8, is first subjected to the pulling over operation at the toe, and the heel seat nailing operation at the heel. Fig. 2 illustrates my process and the shoe construction at this stage, these operations being usual and well known and any suitable machines can be employed for the same, preferably the well known type of pulling-over machine, and any heel seat making machine. While I prefer to pull over the toe portion and secure the same by usual removable lasting tacks 9, 10 and 11, I may employ a wire lasting, holding or other device if desired. Also, while the usual heel seat nailing is indicated with the tacks 10 driven in and clinched against the plate 2, on the last 1, it will be appreciated that I may employ a sewed heel seat if desired, but the usual operations for the toe and heel operations are preferably employed in carrying out my present process. Thereupon the assembled shoe upper and insole, thus partially lasted, is fitted into a lasting machine, preferably of the type shown in the patents referred to. Thereupon I last the forepart of the shoe, as shown in Fig. 3, by means of side wipers indicated generally at 15 and 16, said wipers having a plurality of tack receiving recesses 17, 17 and 18, 18. The marginal portion of the upper around the forepart, indicated at 20, is thus worked, wiped or lasted over the edge of the insole, until the lasting operation is completed and the upper materials are stretched and fitted snugly about the wood of the last and onto the insole. While the lasting wipers 15 and 16 are thus and still held in lasting engagement, the outsole 25 is applied to the forepart, and adjusted and positioned on top of the lasting wipers 15 and 16 and removable lasting tacks 26, 26, are driven through the outsole 25 and through the tack receiving recesses 17, 18, in the lasting plates or fingers 15 and 16, as clearly shown in Fig. 5. These lasting tacks 26 are preferably driven into and through the margin 20 of the upper and into and through the insole 4 to a point flush with the bottom of the last. Before the outsole is applied, a filling material 28 may be fitted in if so desired, this being of any suitable substance, such as felt, ground cork, or other desired filling. It is entirely feasible to make my present shoe without the filling 28, as the relatively slight thickness of the margin 20 of the upper scarcely requires a filler, although a filler is desirable to aid in cementing and uniting the insole and outsole. No substantial filling, however, is needed, as no sewing rib or the like is formed, and of course no trimming of the lasted upper is required.

The shoe as thus made is in the position substantially as shown in Fig. 5, wherein the lasted upper is held in lasted position by removable lasting tacks 26 applied through the outsole and into the insole, before the lasting wipers 15 and 16 are withdrawn.

While I prefer to drive these lasting tacks through tack receiving recesses in the lasting plate or fingers, as explained and as above illustrated, it is entirely within the province of my present process to drive the lasting tacks slightly beyond the innermost edge of the lasting fingers, or indeed to slightly withdraw the lasting fingers while still holding the upper in tension, and to then drive the lasting tacks beyond the edge of the slightly or partially withdrawn lasting devices.

I also prefer to prepare the outsole substantially as shown; a marginal channel is formed and cut, and the leaf turned up, as indicated at 30, together with a stitch receiving groove 31, thus forming a tack receiving rim 33 around the marginal edge of the outsole. This arrangement is desirable as the stitching is concealed after the completion of the shoe, and the tack receiving rim gives a desirable location for the removable tacks 26, which are preferably driven within or spaced sufficiently from the margin of the shoe, so as to permit the setting of the permanent stitching 40 in a predetermined location, disalined from that of the tack receiving rim 31, and hence with the stitching entirely clear of the lasting tacks 26, while said lasting tacks are still in position and before removal of the same.

With the outsole 25 thus applied and held in position on the forepart of the shoe, the lasting wipers or fingers 15 and 16 are then withdrawn, and the marginal portion of the outsole is forced downwardly or snugly against the lasted upper, the same moving readily on the shanks of the lasting tacks 26, and without displacing same or without in any way removing or loosening the holding effect of these lasting tacks. This "snugging down" being readily effected by any tool and usually as the operator inspects the shoe, the movement of the outer part of the sole being only the slight distance or space caused by the removal of the thin lasting fingers.

As shown in Fig. 6, that part of the shoe at the right of the figure, is already snugged down, while at the left the lasting finger 16 is removed, illustrating approximately the slight space between outsole and insole, and which space this snugging operation closes up.

The lasted shoe is now in substantially the position illustrated in Fig. 7, with the forepart attached and the shank and heel portion of the outsole left free. I can perform the shank lasting operation in substantially a similar manner to that just described in lasting the forepart, wherein shank lasting fingers 35 and 36, similar to 15 and 16 already described, but of different contour appropriate for the shank portion of the work, is performed, and meanwhile the shank and rear part of the outsole 25 is either held upwardly or allowed to extend above the shank and heel of the shoe as shown in Figs. 7 and 9. When the shank lasting has been performed by one or more manipulations of the wipers, the outsole 25 is then moved down into position, and the lasting tacks along the shank 38, 38, are applied, being driven downwardly and through the outsole, and preferably on the tack receiving rim 33, in substantially the same manner as the driving of the lasting tacks 26 through the forepart. Thereupon the lasting wipers upon the shank are withdrawn, as shown at Fig. 10, and the outsole snugged down on the shanks of the lasting tacks as above described.

The shoe is now completely lasted, and held in position by the removable lasting tacks 26 and 38, and with the upper conforming closely to the last; thereupon the last 1 is withdrawn and the shoe thus lasted is stitched on any suitable or desirable shoe sewing machine, which applies through and through stitching, and sets the permanent fastening 40 therein, uniting the insole, upper and outsole, disalined from the lasting tacks, and completing the attachment of the upper, insole and outsole. While I prefer to use stitching for this purpose, I can of course employ any through and through fastening, one of the important characteristics of my process being that after the through and through fastenings 40 have been applied, I can then withdraw the removable lasting tacks 26 and 38, thus providing a shoe free from all tacks or other auxiliary holding devices except at heel and extreme toe portions. By utilizing my process, which enables lasting tacks or equivalents to be applied from the outer surface or bottom of the outsole, into and through the lasted upper and the insole while the upper is held under tension due to the wiping; I have devised means which thus holds, temporarily, the insole, lasted upper and outsole, all in lasted position and in close conformity to the last, with sufficient strength to permit withdrawal of the last and to permit uniting of the upper and soles by through and through stitching; thereupon the operator can withdraw and remove said lasting tacks or devices.

From the foregoing it will be appreciated that I have produced, through extremely simple processes, and without extra skill, work or complex machines, but rather by utilizing in a novel manner, present well known shoe factory methods, a strong, flexible, and comfortable shoe having through and through fastenings, and conforming closely to the last on which it was made. By driving removable lasting tacks through the outsole while the upper is under tension due to the wiping, I have eliminated the former step of clinching lasting tacks, which necessarily left these tacks in the shoe, around forepart and shank, which clinching operation was thought to be necessary in order to hold the lasted upper and insole together while a last was withdrawn and the through and through stitching applied. Besides my process permits the outsole to be permanently attached, and to thus remain, and in fact to permit lasting of the sewed shoe before the lasting tacks are withdrawn. The very important feature of applying through and through fastenings, which may be typical McKay shoe stitching, uniting the outsole, upper and insole, while removable lasting tacks or devices are still in position to maintain the conformity of the upper to the last, even with the last removed, is a fundamental feature. While I prefer to remove all lasting tacks along forepart and shank, and may as above explained, remove those lasting tacks at the toe, if desired, I prefer to have the toe portion secured either by several which can be left therein, or by a suitable adhesive, cement or the like, the function of such adhesive being simply to retain this portion of the lasted upper and insole together, while the through and through stitching is applied. As there is but slight distorting strain at the toe while the last is removed, and as the tacks throughout the rest of the forepart, as well as the shank, retain the lasted shoe together, I find that adhesive is perfectly feasible to thus hold the toe portion, until the through and through stitching is applied.

While I have specifically described a procedure in which the operations are performed on a shoe having a certain construction, it will be understood that the same is merely illustrative of one embodiment of this invention; for this invention, as far as this method and procedure is concerned, is applicable in many cases to other types of shoes. It will, furthermore, be understood that certain features, steps and sub-combinations, are of utility and may be employed without reference to other features and steps; that is contemplated by and is within the scope of the appended claims. It is further obvious that various changes may be made in the details of procedure, within the scope of the appended claims, without departing from the spirit of this invention; it is, therefore, to be understood that this invention is not to be limited to the details described and/or shown.

Having thus described the invention, what is claimed is:

1. The improved method of making boots and shoes, which includes as a step the applying from the outside of the outsole and while the upper is held in close conformity to the last, of removable devices to hold the lasted upper, inner, and outsole together, thereafter removing the last, applying through and through fastenings, and thereupon withdrawing the removable devices.

2. The improved method of making shoes employing permanent through and through fastenings, which comprises assembling upper materials and an insole on a last, lasting the upper in close conformity to the last, holding the lasted upper while an outsole is positioned, then applying holding devices through the outsole, upper and insole, thereupon removing the last, applying through and through fastenings, then removing the holding devices, and finishing the shoe in any desired manner.

3. The improved method of making shoes employing permanent through and through fastenings, comprising the following steps of assembling the upper materials and insole on a last, then lasting the heel seat, then lasting the forepart of the upper by means of lasting wipers, holding said material under tension of the wipers, then applying an outsole, next applying removable lasting tacks through the outsole, upper and insole, thereupon removing the wipers, pulling the last, applying through and through fastenings, and thereafter removing the lasting tacks.

4. The improved method of making shoes employing permanent through and through fastenings, comprising the following steps of assembling the upper material and insole on a last, then lasting the toe and heel seat, then lasting the forepart of the upper by means of lasting wipers, holding said upper under tension, then applying an outsole, next applying removable holding tacks through the outsole, upper and insole, thereupon removing the wipers, pulling the last, applying through and through fastenings, and thereafter removing the holding tacks.

5. The improved method of making shoes employing permanent through and through fastenings, comprising the steps of assembling the upper materials and insole on a last, then lasting the heel seat, then lasting the forepart of the upper by means of lasting wipers, holding said upper under tension, then applying an outsole, next applying removable lasting tacks through the outsole, upper and insole, thereupon removing the wipers, applying pressure to bring into contact the outsole and the upper when the wipers are withdrawn, pulling the last, applying through and through fastenings, and thereafter removing the lasting tacks.

6. The improved method of making shoes with the lasting tacks removed from the forepart and shank, which comprises assembling upper materials and an insole on a last, lasting the upper by movable wipers, holding said upper under tension while an outsole is applied, setting lasting tacks through outsole, upper and insole, then removing the last, applying through and through fastenings, and then withdrawing the lasting tacks.

7. The improved method of making boots and shoes, which includes as steps the process of lasting the upper and an insole on a predetermined portion of the last, applying the outsole to said lasted portion only, then lasting the adjacent portion, then applying the outsole to said adjacent portion, uniting the outsole, lasted upper and insole by temporary holding devices, removing the last and applying permanent through and through fastenings, and removing the holding devices.

8. The improved method of making boots and shoes, which includes as steps the process of lasting the upper and insole on the forepart, applying the outsole to said forepart only, then lasting the shank, then applying the outsole to said shank, temporarily uniting the outsole, lasted upper and insole, removing the last and applying permanent through and through fastenings.

9. The improved process of manufacturing boots and shoes, employing permanent through and through stitching, which comprises the steps of holding a lasted upper and insole under tension by temporary holding devices, while an outsole is applied, then driving temporary lasting tacks to unite the outsole, lasted upper and insole, then removing the holding devices and thereupon applying pressure to bring into contact the outsole and lasted upper at the spaces left by removing the said holding devices, thereupon removing the last, applying permanent through and through stitching, and then withdrawing the lasting tacks.

10. In the art of making shoes, the process comprising, wiping the upper over a last, placing a sole on and temporarily tacking the same to the lasted upper while the latter is held under tension due to the wiping, and permanently securing the tacked sole and upper together.

11. In the art of making shoes, the process comprising, wiping the upper over a last, placing a sole on the lasted upper and inserting tacks through the sole and into the lasted upper while the latter is held under tension due to the wiping, and seaming the sole to the upper and removing the tacks.

12. In the art of making shoes the process comprising, wiping an upper over the insole on a last, placing an outsole on the lasted upper, inserting tacks through the outsole and upper and into the insole while the upper is held under tension due to the wiping, removing the last, seaming through the outsole, upper and insole, and removing the tacks.

13. In the art of making shoes, the process comprising, wiping the upper over a last, placing a sole on and temporarily tacking the same to the lasted upper after the latter is wiped over the last and while the upper is held under tension, and releasing the wiping action on the upper after the latter is tacked.

14. In the art of making shoes, the process comprising, wiping an upper over the insole on a last, placing an outsole on the lasted upper, inserting tacks through the outsole and upper and into the insole after the upper is wiped over the insole and while the upper is held under tension, and releasing the wiping action on the upper after the latter is tacked.

15. In the art of making shoes, the process comprising, wiping the upper over a last, placing a sole on the lasted upper and over the wiping means, temporarily tacking the sole to the upper while the latter is held by the wiping means, and withdrawing the wiping means after such tacking.

16. In the art of making shoes, the process comprising, wiping the upper over a last, placing a sole on the lasted upper and over the wiping means, temporarily tacking the sole to the upper while the latter is held by the wiping means, withdrawing the wiping means after such tacking, and moving the tacked sole onto the lasted upper.

17. In the art of making shoes, the process comprising, wiping an upper over the insole, placing an outsole on the lasted upper and over the wiping means, inserting tacks through the outsole and upper and into the insole while the upper is held by the wiping means, and withdrawing the wiping means after insertion of the tacks.

18. In the art of making shoes, the process comprising, wiping an upper over the insole, placing an outsole on the lasted upper and over the wiping means, inserting tacks through the outsole and upper and into the insole while the upper is held by the wiping means, withdrawing the wiping means after insertion of the tacks, and moving the outsole on the tacks and against the lasted upper.

19. In the art of making shoes, the process comprising, wiping the upper over a last and substantially continuously therealong, and placing a sole on and temporarily tacking the same to the lasted upper while the latter is held under tension due to the wiping.

20. In the art of making shoes, the process comprising, moving wipers having edge recesses over the last so as to wipe the upper thereover, placing a sole on the lasted upper and over the wipers, inserting tacks through the outsole and wiper recesses and into the lasted upper, and withdrawing the wipers after insertion of the tacks.

21. In the art of making shoes, the process comprising, wiping a part of an upper over a last, placing a sole on and tacking the same to the lasted part while the latter is held under tension, wiping another part of the upper over the last and tacking the sole to the second lasted part while the latter is held under tension.

22. In the art of making shoes, the process comprising, wiping an upper forepart over a last, placing a sole on and tacking the same to the lasted part while the latter is held under tension, wiping the upper shank part over the last and tacking the sole to the second lasted part while the latter is held under tension.

23. In the art of making shoes, the process comprising, lasting a part of an upper over a last, placing a sole on and temporarily tacking the same to the lasted part, lasting another part of the upper over the last, temporarily tacking the sole to the second lasted part, and permanently securing the tacked sole and upper together.

24. In the art of making shoes, the process comprising, lasting an upper over a last along the forepart, placing a sole on and temporarily tacking the same to the lasted part, lasting the upper over the last along the shank, temporarily tacking the sole to the second lasted part, and permanently securing the tacked sole and upper together.

In testimony whereof I affix my signature this 28th day of October, 1927.

CHARLES B. SPALSBURY.